(12) United States Patent
Downie et al.

(10) Patent No.: US 12,070,756 B2
(45) Date of Patent: *Aug. 27, 2024

(54) MAGNETIC ROD GUIDE FOR A FILTER

(71) Applicant: ADEY HOLDINGS (2008) LIMITED, Stonehouse (GB)

(72) Inventors: Simon Downie, Cheltenham (GB); Kashem Pathan, Worcester (GB); Robert Albrow, Malvern (GB); Mark Button, Stonehouse (GB)

(73) Assignee: ADEY HOLDINGS (2008) LIMITED, Stonehouse (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,657

(22) Filed: Feb. 28, 2022

(65) Prior Publication Data

US 2022/0388011 A1 Dec. 8, 2022

Related U.S. Application Data

(63) Continuation-in-part of application No. 16/313,964, filed as application No. PCT/GB2017/051947 on Jun. 30, 2017, now Pat. No. 11,260,326.

(30) Foreign Application Priority Data

Jun. 30, 2016 (GB) .................................... 1611514

(51) Int. Cl.
*B03C 1/28* (2006.01)
*B03C 1/033* (2006.01)
*B03C 1/034* (2006.01)

(52) U.S. Cl.
CPC ............ *B03C 1/286* (2013.01); *B03C 1/0332* (2013.01); *B03C 1/034* (2013.01);
(Continued)

(58) Field of Classification Search
CPC ....... B03C 1/286; B03C 1/0332; B03C 1/034; B03C 1/284; B03C 1/288; B03C 2201/18;
(Continued)

(56) References Cited

U.S. PATENT DOCUMENTS 2,838,179 A 6/1958 Thomas
3,034,651 A 5/1962 Morrell
(Continued)

FOREIGN PATENT DOCUMENTS

CN 104482366 A 4/2015
EP 3815790 A1 5/2021
(Continued)

OTHER PUBLICATIONS

Metal Supermarkets "What is a ferrous metal?" https://www.metalsupermarkets.com (Year: 2019).

*Primary Examiner* — Liam Royce
(74) *Attorney, Agent, or Firm* — Jacob M. Ward; Ward Law Office LLC (57) ABSTRACT

A magnetic rod guide for a filter is provided that includes a base for attachment to part of a filter, a through aperture through which a magnetic rod can move, and resilient engagement device. The resilient engagement device includes one or more resilient latches for holding the magnetic rod in one or more fixed positions relative to the guide. Each resilient latch is adapted to allow movement of the magnetic rod through the through aperture in either direction, for insertion into the flier or withdrawal from the filter into one of the fixed positions.

8 Claims, 10 Drawing Sheets

(52) U.S. Cl.
CPC .. *B01D 2201/304* (2013.01); *B01D 2201/305* (2013.01); *B03C 2201/18* (2013.01); *B03C 2201/28* (2013.01)

(58) Field of Classification Search
CPC ............ B03C 2201/28; B03C 2201/22; B01D 2201/304; B01D 2201/305
See application file for complete search history.

(56) References Cited

U.S. PATENT DOCUMENTS

| | | |
|---|---|---|
| 3,328,746 A | 6/1967 | Schumacher |
| 3,342,335 A | 9/1967 | Gamundi et al. |
| 3,990,727 A * | 11/1976 | Gallagher ............. F16L 37/252 285/148.2 |
| 4,319,989 A | 3/1982 | Wyland et al. |
| 4,495,068 A | 1/1985 | Rosaen |
| 5,043,063 A | 8/1991 | Latimer |
| 5,171,439 A * | 12/1992 | Vakharia ............ B01D 19/0031 210/500.36 |
| 5,316,151 A | 5/1994 | Thompson |
| 5,730,766 A | 3/1998 | Clements |
| 6,077,333 A | 6/2000 | Wolfs |
| 6,251,273 B1 | 6/2001 | Jawurek et al. |
| 6,572,069 B1 | 6/2003 | Kotthaus |
| 8,636,907 B1 | 1/2014 | Lin et al. |
| 2003/0116494 A1 | 6/2003 | Elsegood |
| 2005/0155750 A1 | 7/2005 | Mitchell et al. |
| 2005/0236322 A1 | 10/2005 | Baumann |
| 2007/0256672 A1 | 11/2007 | Wang |
| 2011/0203976 A1 | 8/2011 | Baker |
| 2013/0112304 A1 | 5/2013 | Lanham et al. |

FOREIGN PATENT DOCUMENTS

| | | | |
|---|---|---|---|
| GB | 2459289 A | 10/2009 | |
| GB | 2469145 A * | 10/2010 | ............ B03C 1/286 |
| KR | 101576185 B1 | 12/2015 | |

\* cited by examiner

MAGNETIC ROD GUIDE FOR A FILTER

CROSS-REFERENCE TO RELATED APPLICATIONS

This application is a continuation-in-part of U.S. patent application Ser. No. 16/313,964, filed Dec. 28, 2018, which in turn is a United States National Stage Patent Application of International Patent Application No. PCT/GB2017/051947, filed Jun. 30, 2017, which in turn claims the benefit of Great Britain Patent Application No. 1611514.9, filed Jun. 30, 2016. The entire disclosures of the above patent applications are hereby incorporated herein by reference.

FIELD

The present invention relates to a magnetic rod guide for a filter.

INTRODUCTION

This section provides background information related to the present disclosure which is not necessarily prior art.

Magnetic filters are used to collect ferrous particles in suspension in piped water systems, for example, in heating and/or cooling systems. Large heating/cooling systems, for example, which use 2 inch (around 50 mm) or greater diameter pipe for the heating and/or cooling circuit(s) generally require a reasonably large filter. Filters sold under the trademark "Magnaclean® Commercial" for magnetic water filters, for example, fit into this category.

These filters generally take the form of a large, heavy, cast or fabricated container, with an inlet and an outlet on either side, a removable lid, and magnets extending into the container to attract and retain magnetic particles from system water as it flows through the filter. These large filters are typically connected into the heating/cooling circuit by providing a welded flange on the inlet and outlet of the filter. A similar flange can be welded onto the pipe ends to be connected, and each pipe flange is then bolted to its corresponding filter flange, some sealing material having been placed in between. A filter of this type may operate at a pressure of up to, for example, 10 bar.

The magnets are provided as magnetic rods, constructed from a number of smaller magnets held in a stack. The magnets are sleeved into the filter from the lid in steel tubes, which depend from the underside of the lid and protect the magnets from damage and degradation. Typically, there may be an array of five magnetic rods extending from the lid of the filter into the filtering chamber within.

In order to service the filter, it is usual practice to remove the lid to be able to clean off the magnetite build up on the sleeves. A problem in carrying out this servicing is that the lid carrying the magnets is fairly heavy. The lid is typically a stainless steel plate of up to 10 mm in thickness. A handle may be provided on the lid to aid its' removal. Lifting points in the form of D links or the like may also be provided around the lid, should mechanical assistance be required. Also, the filter pot is generally magnetic and this can add significantly to the force required to remove the lid. If the filter is not at, for example, ground level, but is at chest height or above, it can be extremely difficult, or even impossible to remove the lid without some sort of mechanical assistance. This can add significantly to the costs of servicing.

Another problem is that if the seals around the top of the magnets break down, then heating and cooling system water can rust the magnets themselves, making them less effective or substantially ineffective over time.

It is an object of the invention to reduce or substantially mitigate these problems.

SUMMARY

According to a first aspect of the present invention, there is provided a magnetic rod guide for a filter comprising a base for attachment to a part of a filter, a through aperture through which a magnetic rod can move, and resilient engagement means including at least one resilient latch for holding the magnetic rod in one or more fixed positions relative to the guide, the or each resilient latch further being adapted to allow movement of a magnetic rod through the through aperture in either direction, for insertion into the filter or withdrawal from the filter into one of the fixed positions.

The magnetic rod guide is intended to be fastened to a lid of a filter in alignment with magnet sleeves extending beneath the lid (to the other side of the lid) with an aperture extending through the lid for inserting and retracting the magnetic rod. By being able to move the magnetic rod in and out of the filter, the magnetic attraction force between the filter body or chamber and the rod can be reduced, therefore reducing the force required to remove the lid. Furthermore, for general servicing, i.e. removal of debris from within the filter, the lid need not be removed, because the magnetic attraction force provided by the magnetic rods can be removed from the filter chamber and the filter flushed through.

At least two fixing apertures may be provided in the base for receiving fixing means. Three or four fixing apertures may be provided. Ideally, the magnetic rod guide is bolted to the filter lid.

A seal is preferably provided for sealing the base to the filter. The seal prevents water lying on top of the filter lid from running down into the magnet sleeves. The magnetic rod guides stand proud on top of the lid and by being sealed to the lid, the likelihood of water entering the sleeves is considerably reduced, thus reducing the risk of corrosion of the magnets.

A body may extend away from the base, the through aperture extending through the body.

The through aperture may be substantially circular.

The resilient locking means includes at least one resilient latch. The or each resilient latch may be formed in the body and have a projection extending inwardly of the body for engagement in a recess in the magnetic rod.

Preferably the projection of the or each resilient latch is "V" shaped, the tip of the "V" shape extending inwardly of the body. By having a "V" shaped latch, the latch can act in both directions, i.e. it latches and releases when a magnetic rod is moved in both directions relative to the latch.

The or each resilient latch may extend substantially parallel to a central axis of the body and a plurality of resilient latches may be spaced around the body.

Preferably three resilient latches are spaced around the body. The magnetic rods are reasonably heavy and by having three latches spaced, preferably equi-spaced, around each rod, the resilient grip force is sufficient to effectively hold and take the weight of the rod.

Reinforcing webs may extend between the base and the body, which support the body against the opposing and opposite spring forces.

The magnetic rod guide may be made from plastics and is preferably integrally moulded.

A seal may be provided inside the through aperture for providing a water-tight seal between the magnetic rod guide and magnetic rod.

The water-tight seal provided inside the through aperture mitigates water ingress into the magnet sleeve from outside the filter. This is particularly advantageous where condensation is present on the magnetic rods when they are in the withdrawn position. The water-tight seal prevents the condensation on the magnetic rods from passing through into the magnet sleeve.

Condensation is a particular problem when the filter is installed in a cooling system since the body of the filter will be cold when the cooling system is in operation and condensation is likely to form. At the same time, any water entering the magnet sleeves may freeze and certainly will not evaporate, making it very difficult to remove.

The presence of water in the magnet sleeve can lead to corrosion. The water can cause damage to the filter from water expansion as the water freezes. Freezing water may push the magnet out of the magnet sleeve, reducing the effectiveness of the filter.

The seal may be provided by a ring. The ring may be held against an inner surface of the through aperture. The seal may comprise a first lip. The first lip may extend inwards from an inner surface of the ring in a direction towards the centre of the through aperture. The first lip may be provided in contact with the magnetic rod. The first lip may provide the water-tight seal between the magnetic rod guide and magnetic rod. The water-tight seal mitigates water leaking into the magnet sleeve.

The seal may comprise a second lip. The second lip may extend inwards from an inner surface of the ring in a direction roughly towards the centre of the through aperture. The second lip may be provided in contact with the magnetic rod. The second lip may be disposed between the first lip and an opening of the through aperture at the top of the magnetic rod guide—i.e. the opening facing away from the filter body. The second lip may be provided above the first lip where the magnetic rod guide is disposed on the lid (at the top) of the filter. The second lip may prevent dust from entering the first lip and magnetic rod. The dust would otherwise reduce the effectiveness of the seal provided by the first lip.

The seal may be of the type known as a "fork seal", which is known to be effective for long-term sealing of a sliding rod through an aperture.

According to a second aspect of the present invention, there is provided an assembly of a magnetic rod and a magnetic rod guide in accordance with the first aspect of the invention, the magnetic rod being substantially cylindrical and sized to slide through the aperture in the guide and having one or more co-operating engagement means for engaging with the resilient engagement means of the guide, one end of the magnetic rod including a handle portion to one side of the magnetic rod guide, for use in moving the magnetic rod through the guide, in use the magnetic rod being movable relative to the magnetic rod guide into a position inside a magnet sleeve where the magnetic rod is held by the resilient engagement means, and where at least one magnet in the magnetic rod is disposed to the same side of the magnetic rod guide as the handle portion.

The co-operating engagement means of the magnetic rod may include a lower circumferential groove positioned towards a lower end of the magnetic rod and an upper circumferential groove positioned towards an upper end of the magnetic rod.

The positioning of the grooves is such that the magnetic rods can be held substantially out of the body of the filter and within the body of the filter.

The upper and lower circumferential grooves may be "V" shaped, providing angled faces outwardly of the magnetic rod sloping upwardly and downwardly of the centre of each groove. With regard to the shape of the latches, this facilitates operation of the latches in both directions of movement, allowing release and re-engagement from both directions. The magnetic rods can be removed in their entirety from the filter, if desired.

The magnetic rod may have a metal magnet section. The metal magnet section may be disposed within the magnet sleeve in the operable position. The magnetic rod may have an extension protruding out of the magnet sleeve in the operable position. A top part of the extension may form the handle. The extension may meet the metal magnet section below the seal.

The extension may be formed from a different material to the metal magnet section.

The extension may be formed from a more insulative material compared to the metal magnet section. The extension may be formed from a material on which condensation is less likely to form compared to the metal magnet section. For example, the extension may be made from plastics.

The handle portion may be provided at the upper end of the magnetic rod enabling manual longitudinal movement of the rod.

The magnetic rod includes a plurality of magnets stacked one on top of the other, separated by ferrous metal spacers and held together about a central bar.

The plurality of magnets may be disposed inside or as part of the metal magnet section.

The magnetic rod may include an air conduit for providing fluidic communication between an interior of the magnet sleeve and the exterior of the filter for allowing air within the magnet sleeve to be displaced as the magnetic rod is inserted into the magnet sleeve. The air conduit may prevent the formation of a vacuum in the magnet sleeve as the magnetic rod is pulled out of the magnet sleeve. The air conduit may allow the air pressure inside the magnet sleeve to equal the air pressure outside of the filter.

The upper end of the magnetic rod may comprise a top port, preferably at a top of the handle. The top port may be provided by a vent. The vent may allow air to pass through. The vent may prevent water or liquids from passing through. At least part of the vent may be formed from GORE-TEX® or another suitable membrane material which is permeable by air and vapour but not by liquid water. The top port is at the top of the magnetic rod, in embodiments where the magnetic rod is movable upwardly out of a lid of the filter. It will be understood that in embodiments where the rod can be retracted from the filter to the side, or downwards from underneath the filter, the "top port" will be positioned accordingly—i.e. always towards an end of the magnetic rod which is furthest from the filter when the rod is retracted from the filter.

The air conduit may be formed from a gap between the central bar and the stack of magnets. In other words, the central bar may be slightly thinner than the hole through the stack of magnets, so that air can flow between the bar and the magnet stack. The central bar may be partially threaded, i.e. threaded along part or parts of its length. The central bar may be partially threaded at a bottom end for screwing a retaining boss to the central bar. The central bar may be partially threaded at a top end for receiving a locking nut. Flats may be provided on threaded portions of the rod for allowing air to flow into and out of the air conduit. In another embodiment, the central bar may have flats provided substantially along its length, or along as much of its length as forms the air conduit. In these embodiments the central bar may be threaded along its length, or along as much of its length as forms the air conduit. Even in some embodiments where the bar is fully threaded, parts of the magnet stack may have a bore which is not threaded, but which is slightly wider than the thickness of the bar. In such embodiments only the parts of the bar which form part of the air conduit, and which have a thread which in use corresponds with a thread on part of the magnet stack, need to have flats for allowing air to flow between the thread and the magnet stack.

A bottom port of the air conduit may be provided. The bottom port may allow air to flow between the magnet sleeve and the air conduit. The bottom port may be disposed below the seal in both the operable position and retracted position. The bottom port is preferably disposed at a bottom of the magnetic rod, in embodiments where the rod is in a lid/roof of the filter and moves upwards to retract it from the filter. In other embodiments where the rod is retracted downwardly or to one side, the "bottom port" may be positioned accordingly, otherwise than strictly "at the bottom". The "bottom port" is always on the inside side of the seal in both the operable position and retracted position.

The bottom port may be provided by channels disposed through a retaining boss. The channels in the retaining boss may allow air from the magnet sleeve to pass through the retaining boss and into the air conduit.

The magnetic rod may comprise at least one central port for allowing air to escape from the air conduit. The central port may be provided by a channel perpendicular to the length of the rod. The central port may be disposed between the top port and bottom port and is "central" in that sense but does not need to be equidistant between the top and bottom ports. The central port may be disposed between a bottom port and the seal when the magnetic rod is in the operable position. The central port may be disposed above the seal in the retracted position.

The central port may be provided through the extension. By providing the central port through the extension, the risk of condensation dripping into the central port when the magnetic rod is in the retracted position is limited because condensation is less likely to form on the extension compared to the metal magnet section of the magnetic rod.

For example, the central port may be disposed substantially at the bottom of the extension. The central port provides an additional path for airflow from the interior of the magnet sleeve to the exterior of the filter.

According to a third aspect of the present invention, there is provided a magnetic filter comprising a filter chamber, an inlet and an outlet, a magnet sleeve for receiving a magnetic rod and at least one assembly of a magnetic rod and magnetic rod guide in accordance with the second aspect of the invention.

A plurality of magnetic rod and magnetic rod guide assemblies may be fitted to the filter, preferably to a lid of the filter.

According to a fourth aspect of the present invention, there is provided a method of cleaning the filter according to the third aspect of the invention comprising isolating the inlet and outlet valves on either side of the filter, pulling on the or each magnetic rod in turn to move it out of the or each respective magnetic rod guide to a position where it extends above the filter lid and is releasably held by the resilient engagement means, opening a drain of the filter and re-opening one of the valves to flush any debris collected in the filter out of the drain.

The ability to withdraw each magnetic rod and to hold it in an inoperative position enables the magnetic force to be removed from the magnet sleeves allowing the magnetite and other debris to be washed away through the filter drain.

DRAWINGS

For a better understanding of the invention, and to show more clearly how it may be carried into effect, a preferred embodiment will now be described with reference to the accompanying drawings, in which.

DETAILED DESCRIPTION

Figure 1:
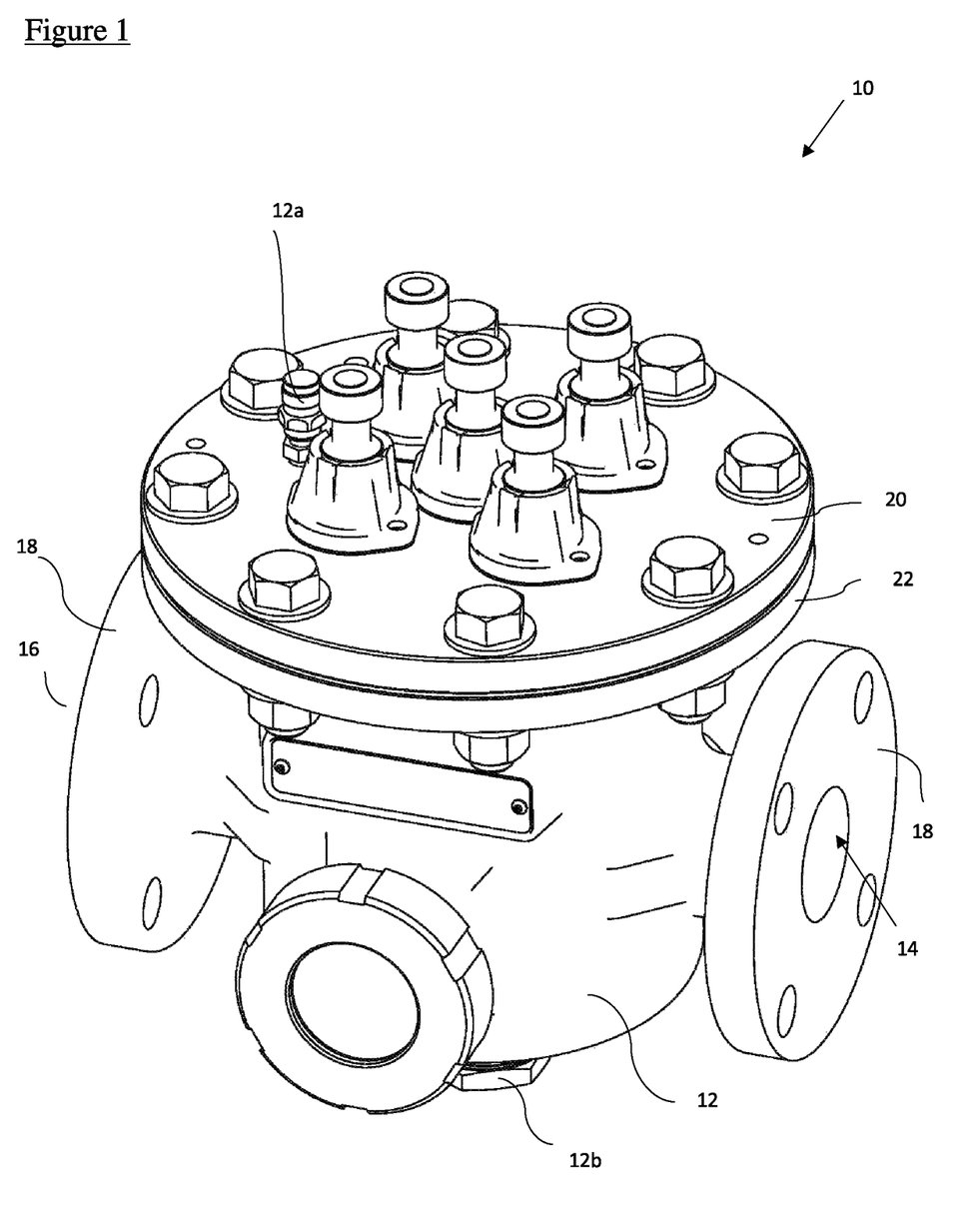
FIG. 1 is a perspective view of a magnetic filter having five magnetic rods held in magnetic rod guides of the invention, with the magnetic rods in an operable position within the filter.

Referring firstly to FIG. 1, a first embodiment of a magnetic filter is indicated generally at 10. The filter 10 has a body 12, typically manufactured as a cast pot. The body 12 includes a chamber. An inlet 14 and an outlet 16 are provided on either side of the body 12, but flow direction is unimportant and the filter can be positioned in a flow pipe in either orientation. In use, valves, not shown, are position on either side of the filter so that it can be isolated from a heating circuit. The inlet and outlet 14, 16 are each formed by circular flange 18 bounding a circular aperture in communication with the inside of the body 12. The filter is intended to be used in a hot water heating system and has an operating pressure of up to 10 bar. The filter 10 includes a bleed valve 12a and a drain 12b.

Figure 5:
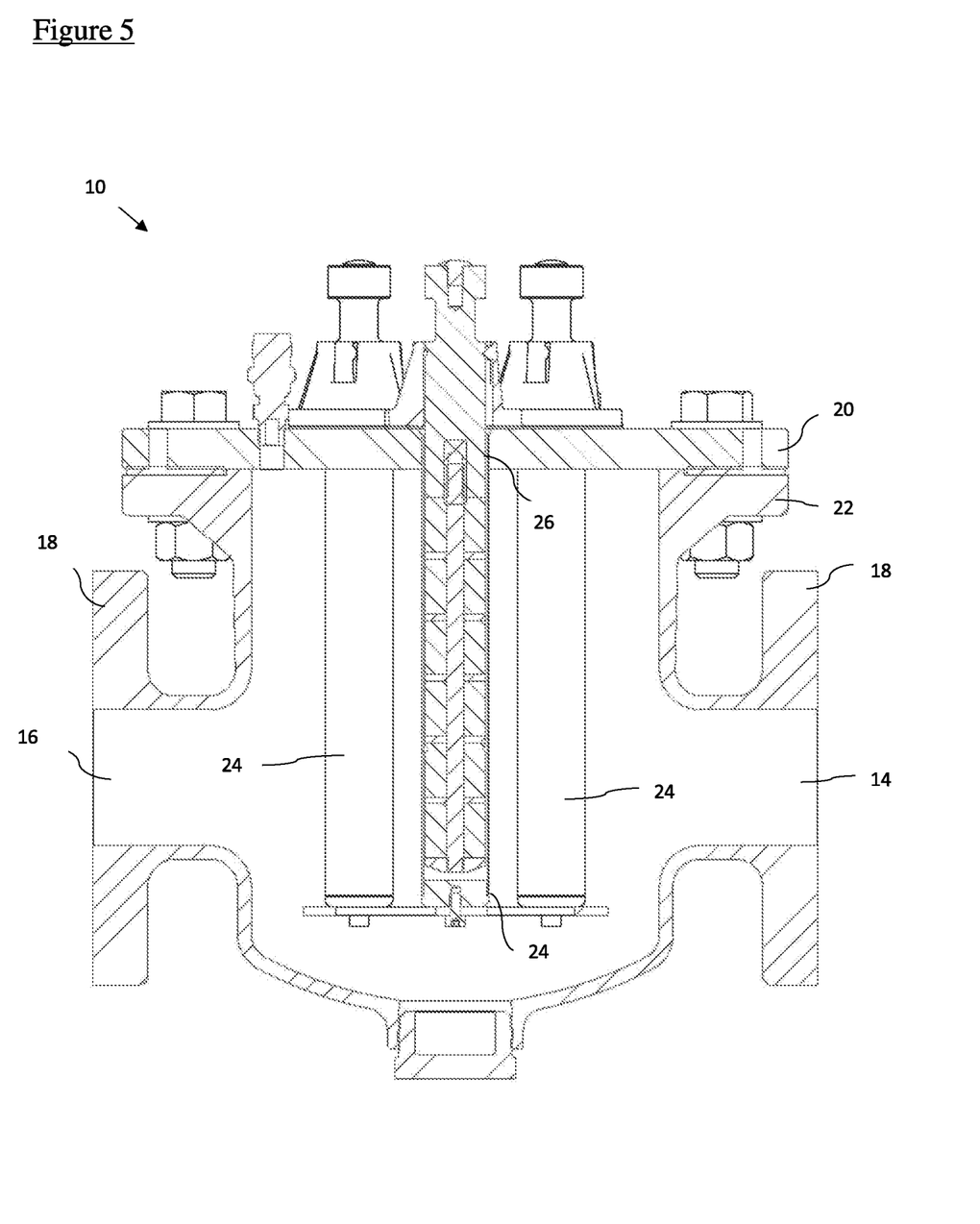
FIG. 5 is a cross-section through the magnetic filter of FIG. 1, with the magnetic rods in an operable position within the filter.

A lid 20 of the filter 10 is provided in the form of a circular plate, which is bolted to a circular flange 22 provided at the top of the filter 10. A rubber seal (not shown) sits between the lid 20 and flange 22. Referring in particular to FIG. 5, magnet sleeves 24 with closed lower ends are welded to the underside of the lid 20. An aperture 26 is provided through the lid 20 for each sleeve 24, at the points where each sleeve 24 is sealed to the lid 20.

Each sleeve 24 is spaced from its neighbouring sleeves 24. Each sleeve 24 is in the form of a tube with a closed end. Each sleeve 24 is made of steel in this embodiment. The closed end of each sleeve 24 is spaced from the bottom of the chamber in the filter 10. A plate is connected to the closed ends of the sleeves 24.

In this embodiment, a guide 28 for a magnetic rod is provided over each aperture 26. In total, there are five guides 28. An enlarged view of a magnetic rod guide 28 is shown in isolation in FIG. 3. In this embodiment, each magnetic rod guide 28 is substantially identical and integrally moulded from plastic. Other materials may be used in alternative embodiments.

Each magnetic rod guide has a body 28a with a base 28b. The body 28a extends upwardly from the base 28b. Holes 30 through the base 28b allow the magnetic rod guide to be bolted or otherwise fixed to the lid 20. The holes 30 are provided on opposite sides of the base 28b. It is envisaged that more than two fixing holes 30 may be provided, for example, three or four fixing holes spaced around the base, for example, equi-spaced around the base. Reinforcing columns or webs 32 are spaced equidistantly around the body 28a for support. A third reinforcing web 32 is hidden behind the body 28a in FIG. 3. A seal (not shown) is provided between the base 28b and the lid 20, preventing water from leaking into the magnet sleeve 24.

Figure 3:
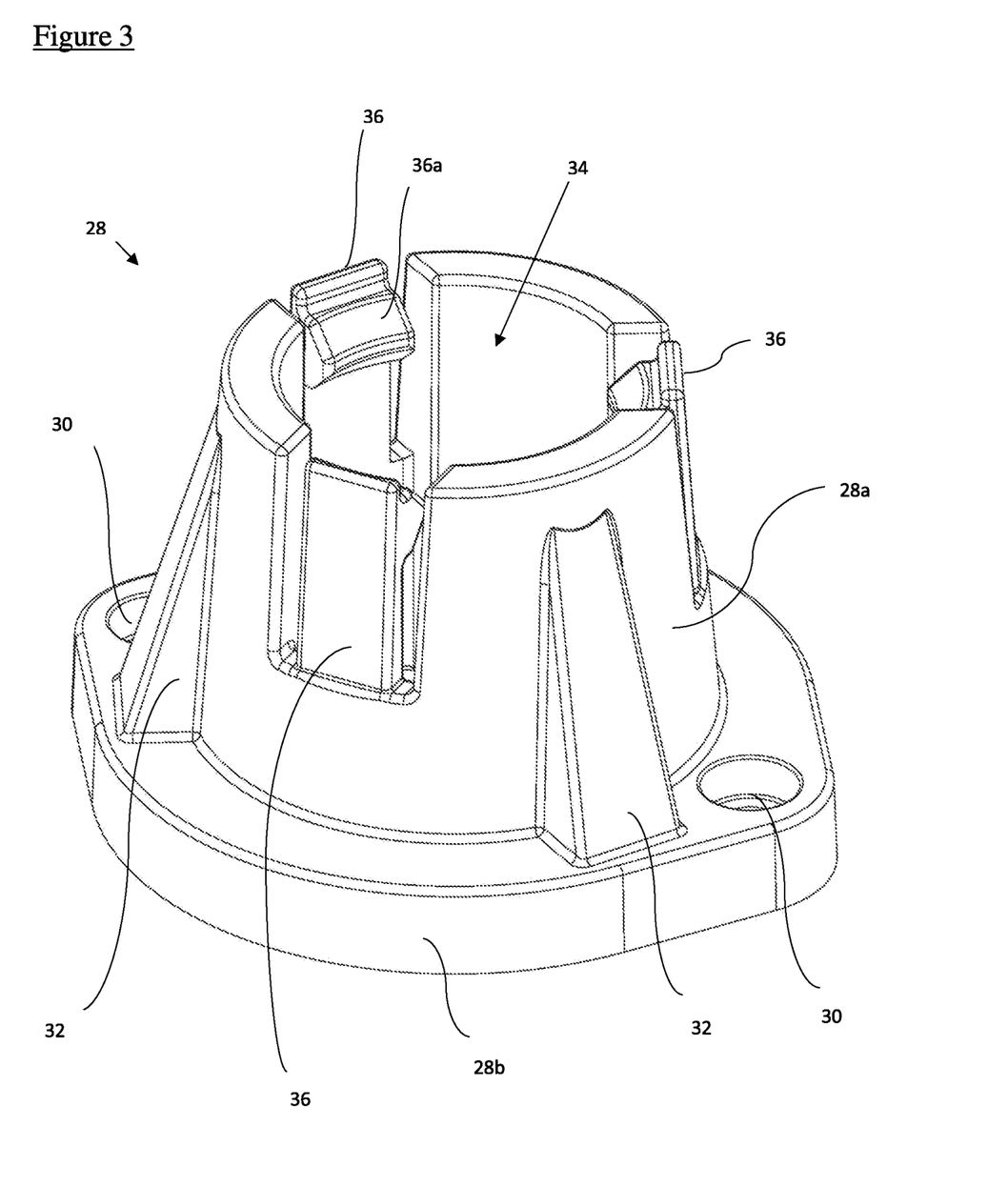
FIG. 3 is a perspective view of an example of magnetic rod guide.

Each magnetic rod guide 28 includes a through aperture 34, extending through the body 28a and base 28b, for receiving a magnetic rod. The through aperture 34 is circular in cross-section. The through aperture 34 is essentially a cylindrical bore extending along an axis of the body 28a. Resilient latches 36 are disposed around the periphery of the through aperture 34 for releasably engaging the magnetic rod. A V-shaped projection or detent 36a is provided near the end of each latch 36, facing inwardly to engage corresponding portions of the magnetic rod. The latches 36 are each positioned between the reinforcing webs 32.

Each latch 36 is connected to the body 28a at its lower end, allowing outward flexing when a magnetic rod moves through the through aperture 34 in either direction. The sides of the latch 36 are spaced from the body 28a, so each latch 36 is free to pivot about its lower end when a magnetic rod is inserted or retracted through the guide 28. The top of each latch 36 is substantially at the same height as the top of the body 28a, but may be lower than the height of the body 28a.

Each V-shaped detent 36a has a chamfered end to lower friction against the magnetic rod. Similarly, each V-shaped detent 36a is inwardly curved. Together, the curves of the detents 36a of the latches 36 collectively define arc portions of an incomplete circle, which complement the shape of the magnetic rod. The latches 36 are sufficiently resistant to flexing that they can support the weight of a magnetic rod without the rod slipping past the latches 36.

Figure 2:
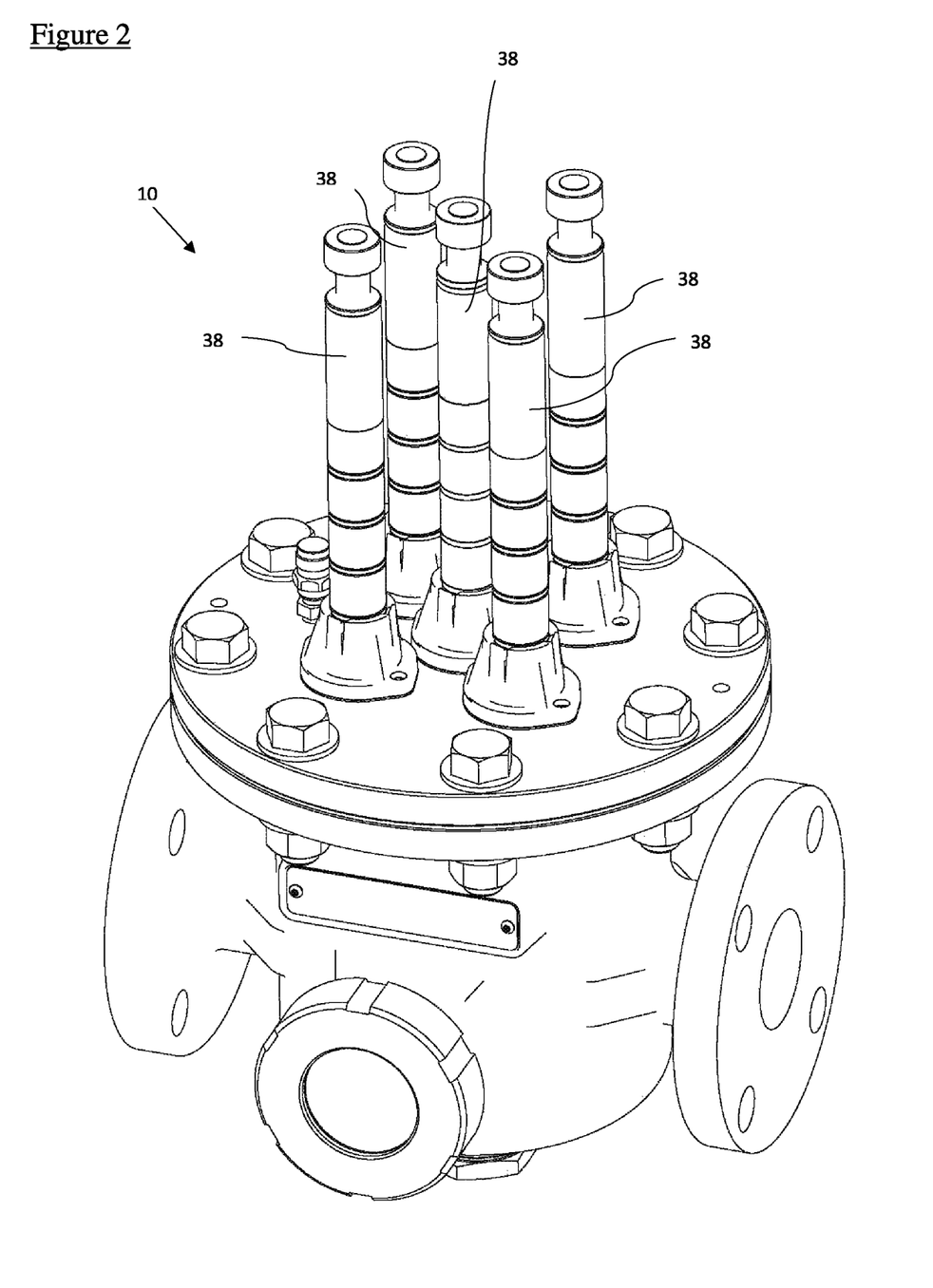
FIG. 2 is perspective view of the magnetic filter of FIG. 1, with the magnetic rods in a retracted position for cleaning of the filter.
Figure 6:
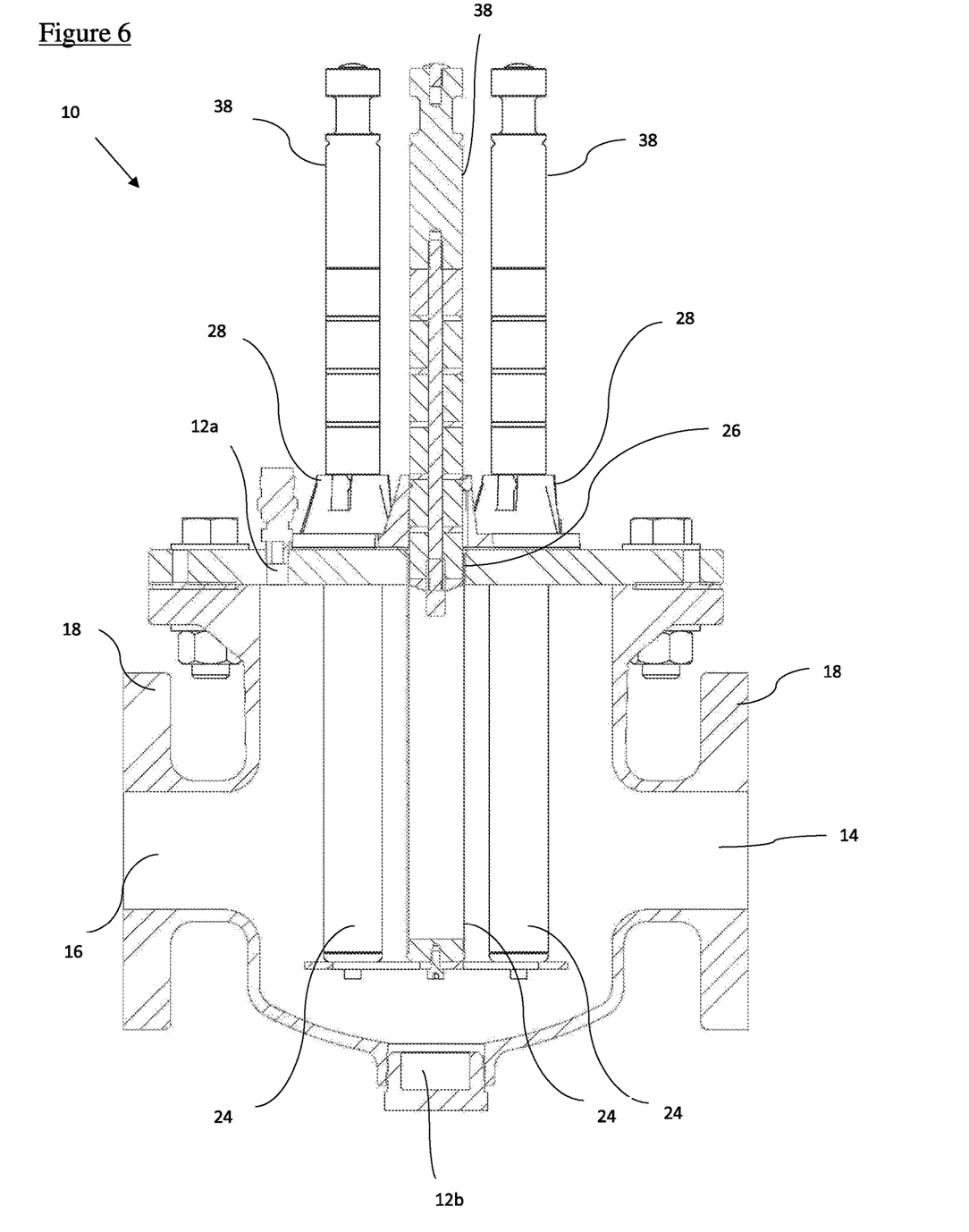
FIG. 6 is a cross-section through the magnetic filter of FIG. 1, with the magnetic rods in a retracted position for cleaning of the filter.

Magnetic rods 38 are insertable into the filter 10, as seen in FIGS. 1 and 5. The magnetic rods 38 can be retracted from the filter 10, as seen in FIGS. 2 and 6. Five magnetic rods 38 are provided in a cross arrangement in this embodiment. The cross is positioned on a substantially central axis of the filter 10.

Figure 4:
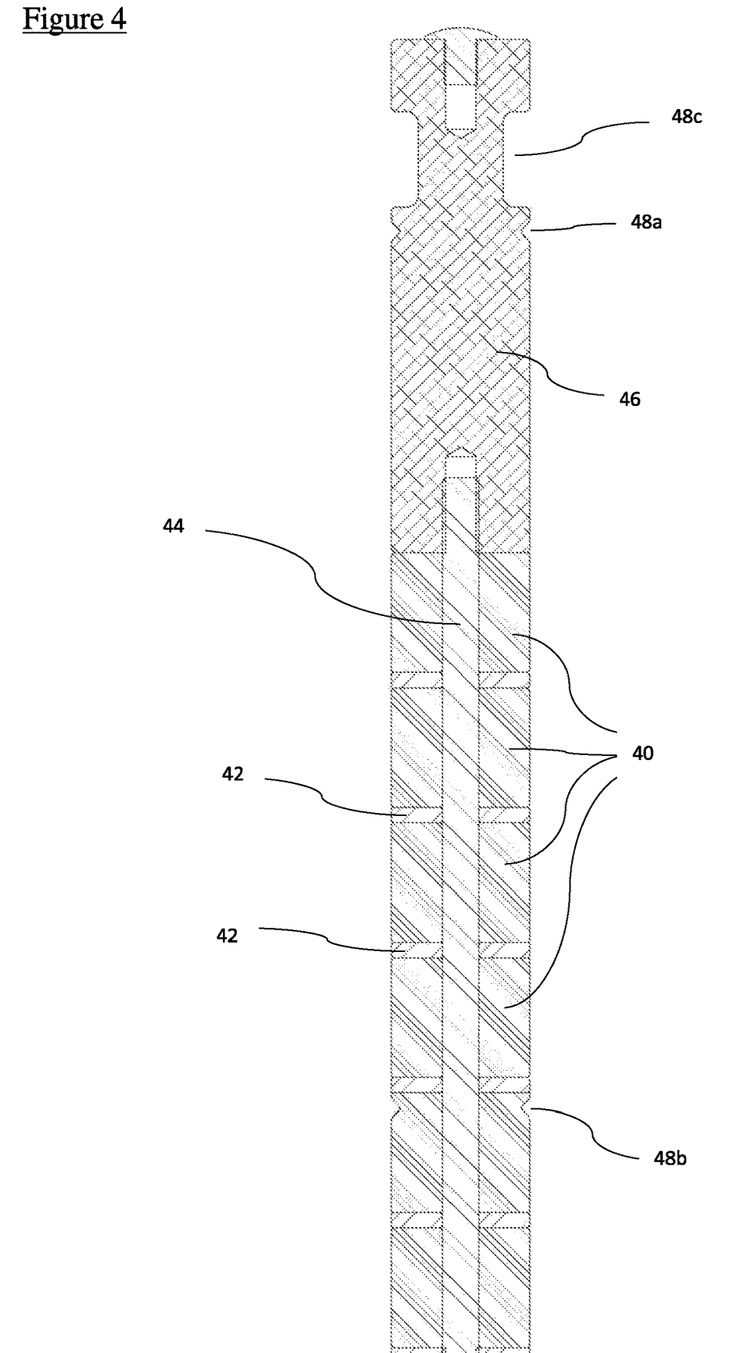
FIG. 4 is a cross-section through a magnetic rod suitable for use with the magnetic rod guide of FIG. 3.

A magnetic rod 38 is shown in isolation in FIG. 4. The rod 38 includes a stack or column of magnets 40 separated by ferrous metal spacers 42. The magnets 40 are secured to a central bar 44. A handle 46 is provided at the top of the rod 38 for pulling the rod 38 out of the filter 10, and also pushing the rod 38 back into the filter 10. The central bar 44 partially extends into the handle 46.

Annular or circumferential grooves are provided around each rod 38. These grooves allow for each magnetic rod 38 to be fixed in different positions relative to its magnetic rod guide 28. One groove 48a is provided on the handle 46. A second groove 48b is provided near the opposite end of the rod 38, in the lower quartile of the rod. In this embodiment, the groove 48b is inset from the end, and indents the second magnet 40 from the end. It may indent the third magnet from the end. Both grooves 48a, 48b are substantially V-shaped. The grooves 48a, 48b therefore have complementary shapes to the detents 36a of the latches 36 of the magnetic rod guide 28. The upper groove 48a sits against the detents 36a when the magnetic rod 38 is provided inside the filter 10, in an operative position. The lower groove 48b sits against the detents 36a when the magnetic rod has been retracted from the filter 10.

The handle 46 also includes another annular groove 48c. This provides a surface facing towards the lid 20 which aids gripping of the handle 46 when retracting the magnetic rod 38 from the filter 10. Alternatively, a plurality of grooves may be provided to improve grip of the handle.

In use, the filter 10 is provided as part of a central heating system. During operation of the system, magnetic impurities are filtered from the water in the system and accumulate around the sleeves 24 due to the inserted magnetic rods 38. To clean the filter, the filter is first isolated by closing valves either side of the filter. The magnetic rods 38 can be retracted from the filter 10 through the respective apertures 26 in the lid 20. The sleeves do not then have magnets inside them. The magnetic rod guides 28 are bolted to the lid 20 and do not retract with the rods 38.

Each magnetic rod 38 is retracted from the filter 10 by pulling on the respective handle 46. This force causes the groove 48a to bear against angled faces of the detents 36a of the retaining latches 36. The latches 36 are flexed outwardly from the rod 38 as a result, allowing the detents 36a to exit the groove 48a. The rod 38 then moves upwardly along a central axis of the magnetic rod guide 28, with the latches 36 held outwardly flexed as the V-shaped detents 36a run over the surface of the rod 38. When retracted sufficiently, the latches 36 are able to relax into the lower groove 48b, engaging the magnetic rod 38 and holding it in a retracted position, outside the filter 10. Repeating this for each magnetic rod 38 gives rise to an arrangement similar to those of FIGS. 2 and 6. If necessary, the rods 38 can be pulled further and deliberately removed from the lid 20, pulling the rod 38 free of the latches 36.

With the rods 38 retracted, the drain 12b is opened and one of the valves to the filter is opened to flush water through the filter and out of the drain. This process washes the magnetite and other impurities which have built up off the sleeves and out of the drain. The rods 38 remain securely in place on the lid 20 due to the guides 28, unless deliberately removed as mentioned above. When cleaning is complete, the valve can be closed, the drain 28*b* closed and the valves both sides re-opened. Air can be bled off through the bleed valve. The rods 38 can then be inserted back into the sleeves 24 of the filter by pushing them in the opposite direction to that used for retracting the rods 38, in the reverse operation. The latches 36 flex outwardly from the lower groove 48*b* and re-engage the upper groove 48*a* when sufficiently inserted. In this way, the lid need never be removed from the filter and the filter can be simply flushed through with the magnetic attraction temporarily removed.

Figure 7:
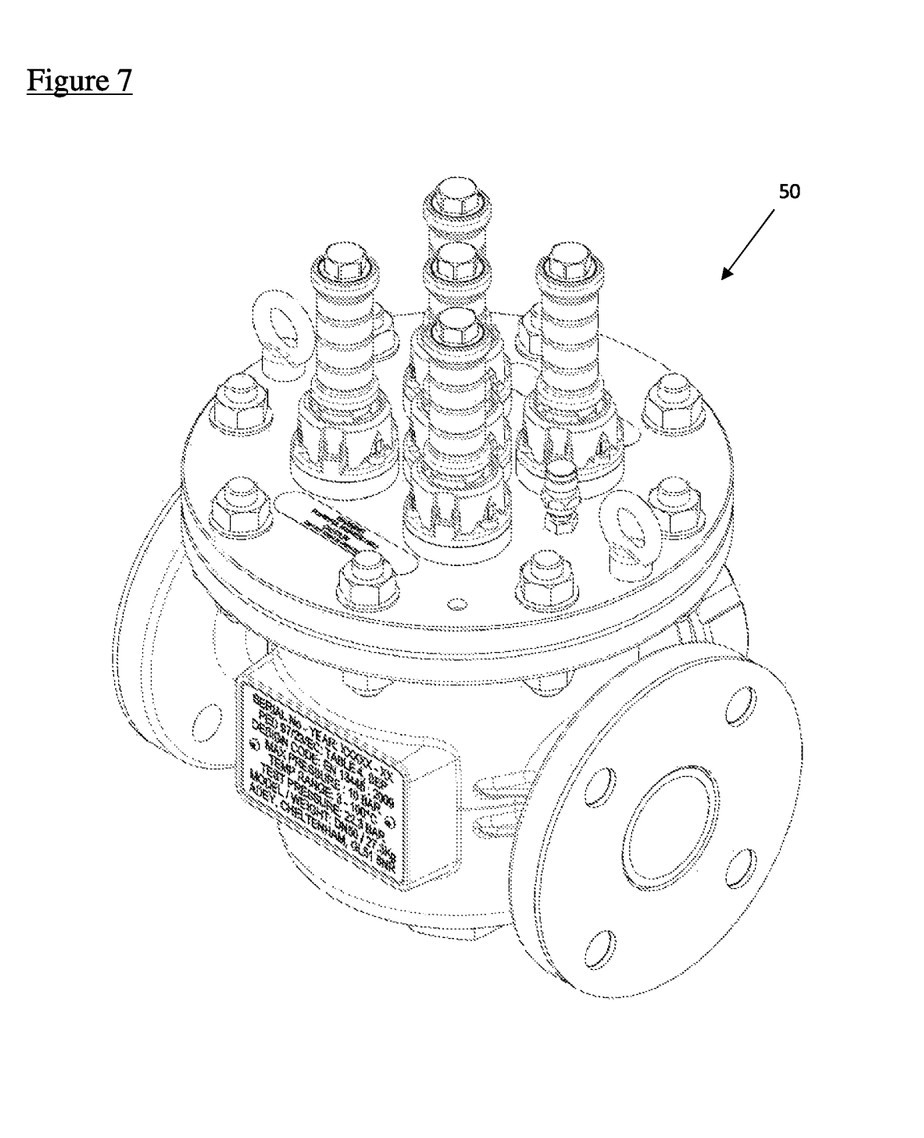
FIG. 7 is a perspective view of a second embodiment of a magnetic filter having five magnetic rods held in magnetic rod guides of the invention, with the magnetic rods in an operable position within the filter.
Figure 8:
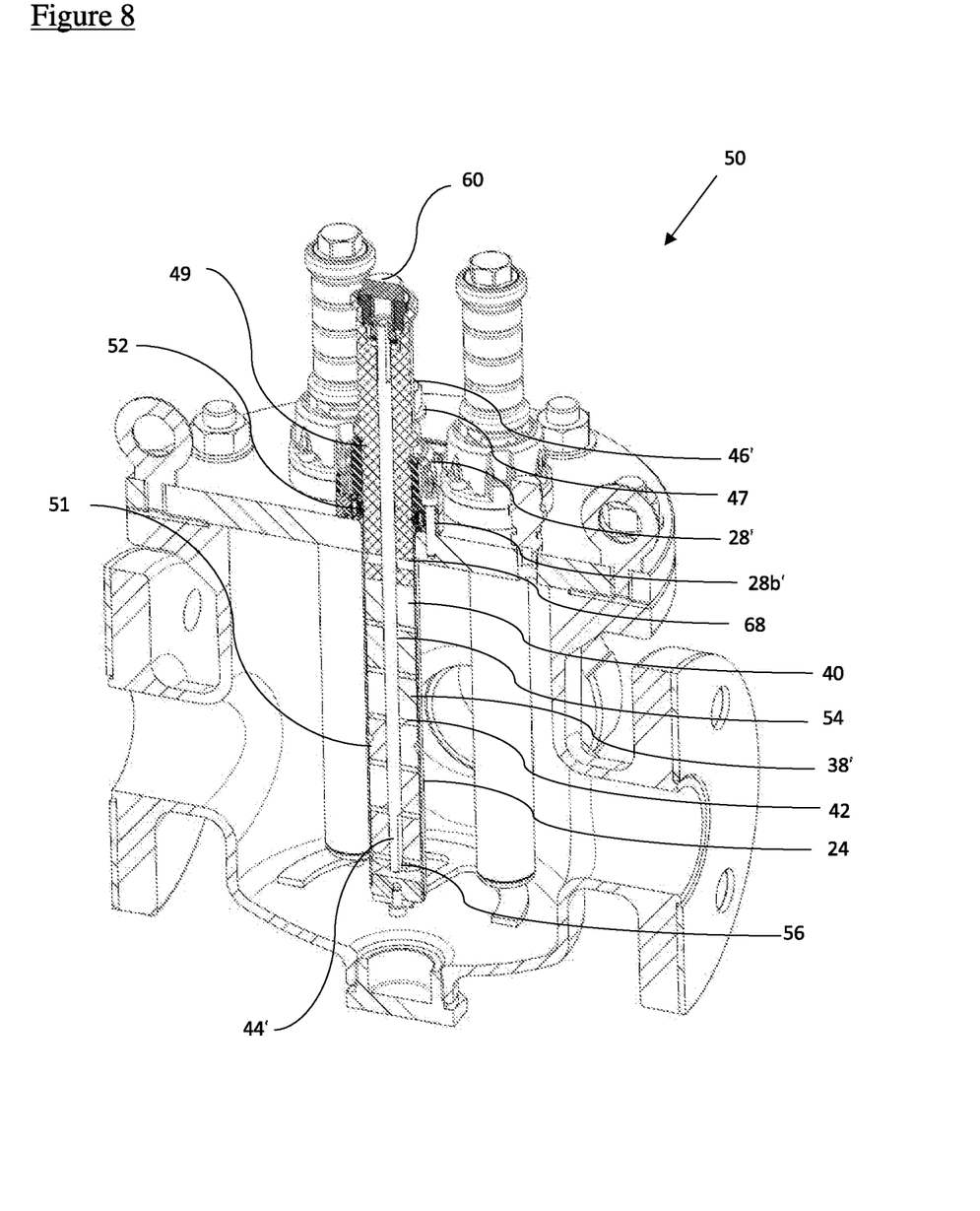
FIG. 8 is a cross-section through the magnetic filter of FIG. 7, with the magnetic rods in an operable position within the filter.

Now referring to FIGS. 7 and 8, a second embodiment of a filter according to the present invention is shown generally at 50. Where the features of the filter 50 are not described, they can be considered identical or similar to those of the first embodiment. As certain features of the second embodiment are similar to those of the first embodiment, the same reference numerals will be used to indicate those features.

In this embodiment, the magnetic rod guides 28' include a seal 52. The seal in this embodiment is provided by a ring 53. The ring 53 sits in a groove around an inside surface of the magnetic rod guide 28'.

The ring 53 has an inside wall 53*a*. The ring has an outside wall 53*b*. The inside wall 53*a* is parallel to the outside wall 53*b*. A top edge of the inside wall 53*a* is connected to the top edge of the outside wall 53*b* by a connecting portion, perpendicular to both the inside wall 53*a* and outside wall 53*b*. In other words, the ring 53 has a U-shaped cross section.

The U-shaped cross-section of the ring allows a bottom edge of the inside wall 53*a* to pivot towards the outside wall 53*b* as the magnetic rod 38' is inserted. The movement of the inside wall 53*a* allows the seal 52 to accommodate the magnetic rod 38' in the magnetic rod guide 28'.

In this embodiment, the ring 53 has a first circumferential lip 52*a* protruding from the inside wall 53*a* towards the centre of the through aperture 26. This is best shown in FIG. 9*b* in the operative position and FIG. 10*a* in the retracted position. The first lip 52*a* provides a water-tight seal between the magnet sleeve 24 and the exterior of the filter 50. The water-tight seal prevents water entering the sleeve 24 from the exterior of the filter 50, e.g. condensation that has dripped down the magnetic rod 38'.

Figure 9:
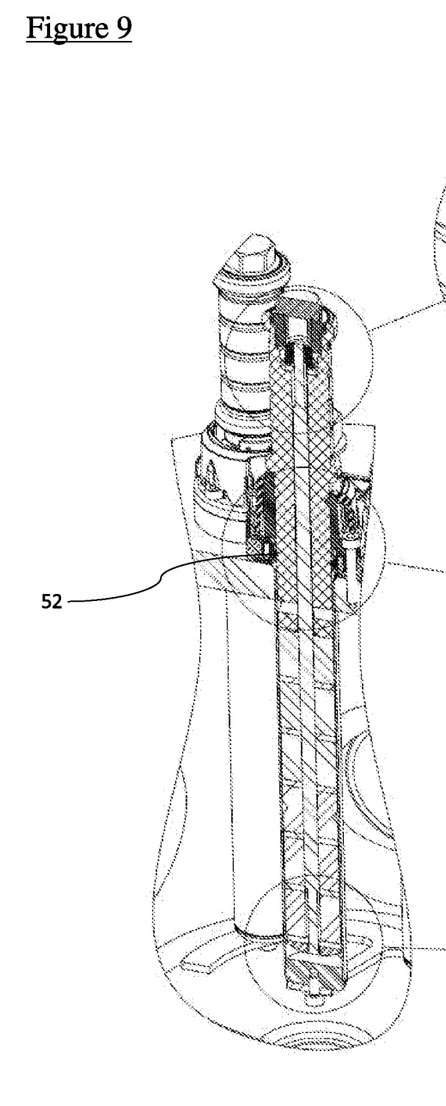
FIG. 9 is a cross-section through a portion of the magnetic filter of FIG. 7, with the magnetic rods in an operable position within the filter.
Figure 9A:
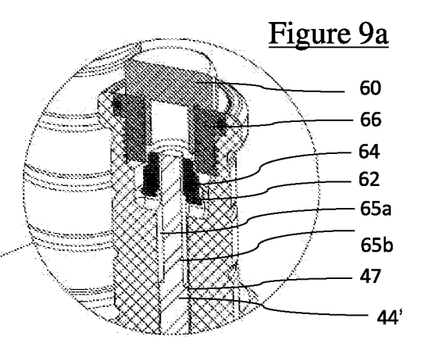
FIG. 9a is a close-up of a handle of the magnetic filter of FIG. 9, with the magnetic rods in an operable position within the filter.
Figure 9B:
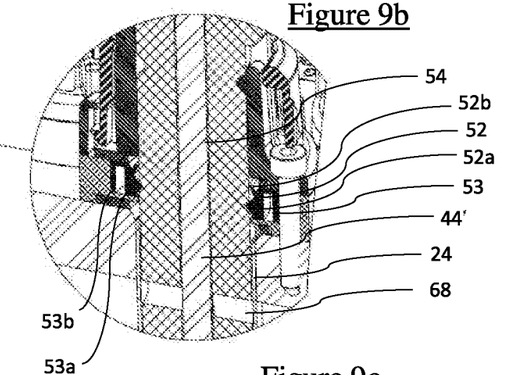
FIG. 9b is a close-up of a seal of the magnetic filter of FIG. 9, with the magnetic rods in an operable position within the filter.
Figure 10:
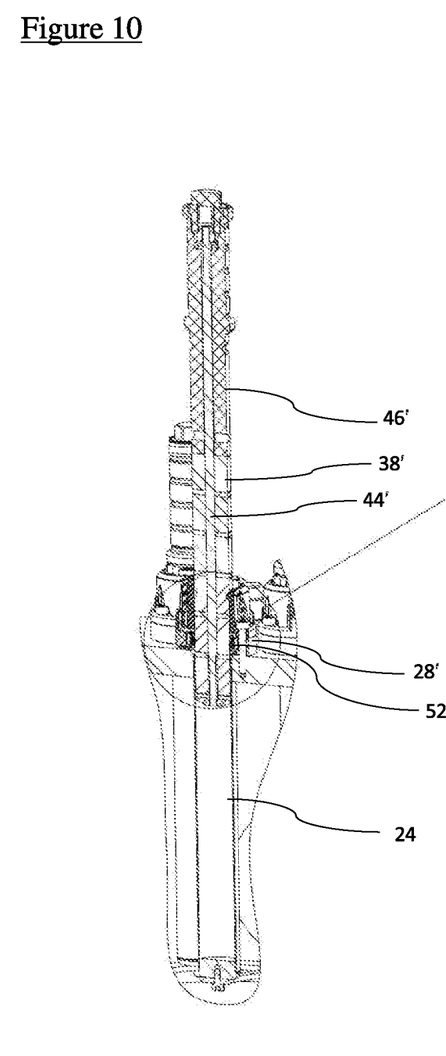
FIG. 10 is a cross-section through a portion of the magnetic filter of FIG. 7, with the magnetic rods in a retracted position for cleaning the filter.
Figure 10A:
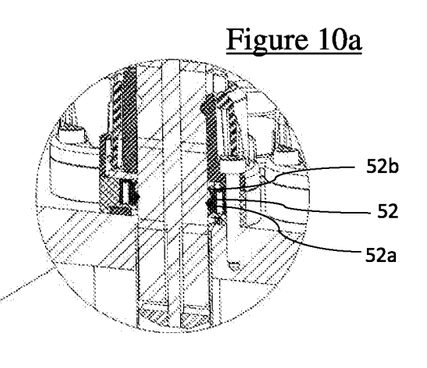
FIG. 10a is a close-up of a seal of the magnetic filter of FIG. 10, with the magnetic rods in a retracted position for cleaning the filter.

As shown in FIGS. 9 and 10, the first lip 52*a* is in contact with the magnetic rod 38' in both the operative position and the retracted position.

The water-tight seal is particularly advantageous where the filter is used in cooling systems. In a cooling system, the body of the filter will be cold, possibly below freezing, when the system is in operation and cooling fluid (for example glycol or another antifreeze) is flowing around the heating circuit. Condensation may build up on the surface of the magnetic rods 38' when in the retracted position (i.e. during servicing). The seal 52 mitigates water ingress from water running down the surface of the magnetic rod 38' in the service position. When the magnetic rods 38' are inserted into the sleeves 24 to return them to the operative position, the seal 52 prevents the condensation present on the surface of the magnetic rods 38' from entering the sleeve 24.

If moisture were to enter the sleeve 24, the expansion of the water as it freezes may cause damage to the filter 50. Moisture in the sleeve 24 may facilitate corrosion and reduce the lifespan of the filter 50 before it needs replacing.

The first lip 52*a* has a "V-shaped" profile. The point of the "V" points inwards towards the centre of the aperture 26 from the inside wall 53*a* of the ring 53. The tip of the "V" extends to about a millimetre into the aperture 26 when the magnetic rod 38' is absent. This allows the "V" to come into contact with the magnetic rod 38' when it is inserted. When the magnetic rod 38' is inserted, the point of the "V" comes into contact with the magnetic rod 38'. The magnetic rod 38' pushes the first lip 52*a*, and by extension the inside wall 53*a*, towards the outside wall 53*b*.

The first lip 52*a* provides a water-tight seal, preventing water from which has entered the magnetic rod guide 28' from passing the first lip 52*a* and into the sleeve 24. The "V" shape of the first lip 52*a* facilitates movement of the magnetic rod 38' along the axis of the sleeve 24 in either direction.

The seal 52 has a second lip 52*b*. The second lip 52*b* forms a flange. The second lip 52*b* protrudes from the inside wall 53*a* of the ring 53, in a direction towards the inside of the aperture 26. The second lip 52*b* is disposed between the first lip 52*a* and an opening of the aperture 26. In this embodiment, the second lip is disposed above the first lip 53*a*. The second lip 52*b* protrudes at an angle facing away from the first lip 52*a*, in a direction towards the opening of the aperture 26. The second lip 52*b* protrudes in a direction roughly parallel to a bottom edge of the "V" shaped of the first lip 52*a*.

The second lip 52*b* contacts the magnetic rod 38' when in use. When the inside wall 53*a* is pivoted towards the outside wall 53*b*, the second lip 52*b* pivots towards the magnetic rod 38' The second lip 52*b* forms a dust-seal. The second lip 52*b* mitigates dust from collecting between the first lip 52*a* and the magnetic rod 38'. The dust may otherwise reduce the effectiveness of the water-tight seal. In this embodiment the two lips 52*a*, 52*b* are provided by a fork seal. In this embodiment, the magnetic rod 38' has a metal magnet section 51. The metal magnet section 51 forms a bottom portion of the magnetic rod 38'. The magnetic rod 38' has an extension 49 protruding out of the sleeve 24. The rod extension 49 forms a top portion of the magnetic rod 38'. In this embodiment, the rod extension 49 is made from plastic. The metal magnet section 51 and rod extension 49 are best shown in FIG. 8. The rod extension 49 meets the metal magnet section 51 below the seal 52 when the magnetic rod 38' is in the operable position. In the operable position, the metal magnet section 51 is flush with the sleeve 24.

In this embodiment, the metal magnet section 51 and the rod extension 49 are substantially similar in length. In other embodiments, where the magnetic filter 50 is taller and provides longer sleeves, the metal magnet portion 51 may be substantially longer than the rod extension 49.

A top of the rod extension 49 forms the handle 46'. The handle 46' is disposed above the magnetic rod guide 28'. The handle 46' provides a means for pulling the magnetic rod 38' out of the sleeve 24, as in the first embodiment.

In this embodiment, the central bar 44' is a partially threaded rod. The central bar 44' extends substantially through the handle 46'. The central bar 44' is made from stainless steel. As in the first embodiment, the central bar 44' passes through the stack of magnets 40 and washers 42.

An air conduit 54 is provided between the interior of the sleeve 24 and the exterior of the filter. The air conduit 54 provides a means for fluidic communication between the sleeve 24 and the exterior of the filter 50. The air conduit 54 allows air in the sleeve 24 to be displaced when the magnetic rod 38' is moved from the retracted position to the operable position (i.e. air is not trapped inside the sleeve 24). The air conduit 54 allows air flow into the sleeve 24 when the magnetic rod 38' is moved from the operable position to the retracted position.

The air conduit 54 allows the air pressure inside the sleeve 24 to be equal to the air pressure outside of the filter 50. This is particularly crucial in this embodiment of the invention, where the seal 52 mitigates air flow from the magnetic sleeve 24 to the exterior of the filter.

The air conduit 54 is disposed between the central bar 44' and the sleeve 24.

In this embodiment, an internal channel provided by a gap between the central bar 44' and the stack of magnets 40 and washers 42 provides the air conduit 54.

The stack of magnets 40 and washers 42 are clamped tightly clamped together. The stack of magnets 40 and washers 42 are clamped together to ensure they are aligned and the facilitate insertion of the metal magnet section 51 into the sleeve 24.

In other embodiments, the assembled parts are machined to maintain a gap between the central bar 44' and still sit inline sufficiently to fit into the sleeve 24 without interference.

A portion of the bottom of the central bar 44' is connected to a retaining boss 58. A portion of the thread of the central bar 44' is threaded at a bottom end for screwing into a threaded aperture in the retaining boss 58. The retaining boss 58 prevents the stack of magnets 40 and washers 42 from sliding off the central bar 44'. The threaded bottom portion of the central bar 44' has two flats machined onto it 59a, 59b. The flats 59a, 59b allow the retaining boss 58 to be screwed onto the central bar 44' while maintaining airflow between the sleeve 24 and the air conduit 54 through the thread portion of the central bar 44'.

Figure 9C:
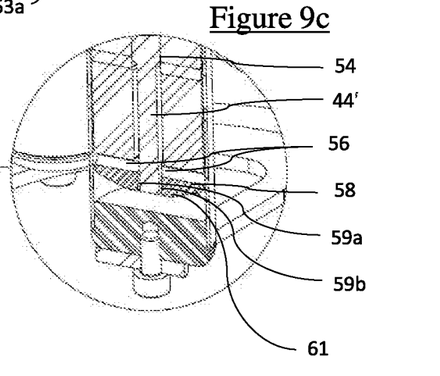
FIG. 9c is a close-up of a lower end of a magnetic rod of FIG. 9, with the magnetic rods in an operable position within the filter.

The air conduit 54 has bottom ports 56, best shown in FIG. 9c. The bottom ports 56 are provided adjacent to a bottom of the central bar 44'. The bottom ports 56 are provided by channels running through the retaining boss 58. The channels are provided by a cross-drilling through the threaded aperture in the retaining boss 58. The channels extend from one side of the retaining boss 58 to an opposing side of the retaining boss 58. The channels are disposed perpendicular to the threaded aperture in the retaining boss 58.

The retaining boss 58 has a bottom face 61. The bottom face 61 of the retaining boss is roughly conical for encouraging air in the sleeve 24 to flow around the retaining boss 58 and into the bottom ports 56.

The bottom ports 56 allow air to move between the interior of the sleeve 24 and the air conduit 54 through the threaded central bar 44'.

The air conduit 54 has a top port 60, best shown in FIG. 9a. The top port 60 is provided by a vent. The vent is disposed in the top of the handle 46'.

The rod extension 49 has a cylindrical aperture 47 which extends from the bottom of the rod extension 49 towards the handle 46'. The cylindrical aperture 47 extends substantially through the handle 46'.

The central bar 44' substantially penetrates the rod extension 49 through a cylindrical aperture 47. The central bar 44' substantially penetrates the handle 46' through the cylindrical aperture 47.

The central bar 44' is held in the handle assembly by a washer 62 and a locking nut 64. The locking nut 64 is a stainless-steel nut with a nylon insert. A top portion of the central bar 44' is threaded. The threaded top portion of the central bar 44' has two flats 65a, 65b. The flats 65a, 65b allow the locking nut 64 to be screwed onto the central bar 44' while maintaining airflow between the air conduit 54 and the handle assembly through the top threaded portion of the central bar 44'.

In this embodiment, a screwed boss 66 is disposed in the handle assembly. The screwed boss 66 is disposed above the central bar 44'. The screwed boss 66 has an external threaded surface. The external threaded surface is screwed into a threaded receiving portion in the top of the handle assembly. The screwed boss has a threaded internal surface for receiving the vent. The screwed boss 66 provides access for a correctly sized socket for the locking nut 64 during assembly.

The vent is screwed into the handle assembly. The vent is made from expanded PTFE, for example GORE-TEX® or another suitable membrane or material which is air but not liquid permeable. The GORE-TEX allows air to flow through the vent, between the handle assembly and the exterior of the filter 50. The GORE-TEX vent prevents water ingress into the handle assembly.

The air conduit 54 has a central port 68, best shown in FIG. 9b. The central port is disposed between the top and bottom ports 60, 56, and is "central" in that sense but does not need to be equidistant between the top and bottom ports 60, 56. The central port 68 is disposed below the seal 52 when the magnetic rod 38' is in the operable position.

The central port 68 is provided by a cross drilling through the aperture 47 in the rod extension 49. The central port 68 extends from one side of the rod extension 49 to an opposing side of the rod extension 49. The central port 68 is perpendicular to the axis of the aperture 47 in the rod extension 49. The central port 68 is parallel with the filter chamber lid 20. The central port 68 is disposed adjacent to the bottom of the rod extension 49.

By providing the central port 68 through the rod extension 49, the risk of condensation dripping into the central port 68 when the magnetic rod 38' is in the retracted position is limited because condensation is less likely to form on the extension 49 compared to the metal magnet portion of the magnetic rod 51.

In the operable position, the central port 68 is disposed just below the seal 52 of the magnetic filter 50. By positioning the central port 68 just below the seal 52, air may begin to enter the central port 68 as the magnetic rod 38' is lifted from the retracted position to the operable position shortly after the magnetic rod 38' is lifted.

The central port 68 provides an additional means of connection between the air conduit 54 and the exterior of the filter 50. The central port 68 increases the rate of airflow which can flow into and out of the air conduit 54, when the magnetic rod 38' is removed from the filter far enough to expose the central port 68 to the atmosphere. The central port 68 allows air to be easily transferred from the sleeve 24 to the exterior of the filter 50 and vice versa. The central port 68 facilitates insertion and retraction of the magnetic rod 38' into and out of the sleeve 24. Only for a relatively short distance of motion, when the magnetic rod 38' is nearly fully inserted into the filter, does air exchange with the atmosphere have to take place exclusively through the GORE-TEX vent 60. Relatively speaking, airflow through the vent 60 may be constricted compared to airflow through the central port 68. Hence, for a majority of the distance of travel of the magnetic rod 38', airflow through the central port 68 is relatively unrestricted.

The air conduit 54 allows air to flow freely between the sleeve 24 and the atmosphere, through the magnetic rod components. The air conduit 54 mitigates resistance from a vacuum in the magnetic sleeve 24 as the magnetic rod 38' is retracted from the sleeve 24. The air conduit 54 mitigates resistance from air in the sleeve 24 as the magnetic rod 38' is reinserted into the sleeve 24. The construction of the conduit mitigates the risk of water ingress into the sleeve 24.

The embodiments described above are provided by way of example only, and various changes and modifications will be apparent to persons skilled in the art without departing from the scope of the present invention as defined by the appended claims.

What is claimed is:

1. An assembly, comprising:
a magnetic rod guide including
a base for attachment to a part of a filter,
a through aperture through which a magnetic rod can move, and
resilient engagement means including at least one resilient latch on the guide for releasably holding the magnetic rod in one or more fixed positions relative to the guide,
each of the at least one resilient latch further being adapted to allow movement of a magnetic rod through the through aperture in either direction, for insertion into the filter or withdrawal from the filter into one of the fixed positions, in which a first seal is provided inside the through aperture for providing a water-tight seal between the magnetic rod guide and magnetic rod; and
a magnetic rod being cylindrical and sized to slide through the aperture in the guide and into a magnet sleeve of the filter and having one or more co-operating engagement means for engaging with the resilient engagement means of the guide, one end of the magnetic rod including a magnetic rod handle portion, for use in moving the magnetic rod through the guide, the magnetic rod handle portion being disposed on one side of the guide, the magnetic rod being movable relative to the magnetic rod guide and movable into a position where the magnetic rod is held by the resilient engagement means, and where at least one magnet in the magnetic rod is disposed to the same side of the magnetic rod guide as the handle portion
wherein at least a portion of an upper end of the magnetic rod comprises a material breathable but waterproof for allowing air to flow from a vent to an exterior of the filter.

2. The assembly of claim 1, wherein the magnetic rod comprises an air conduit for communicating an interior of the magnet sleeve and an exterior of the filter for allowing air within the sleeve to be displaced as the magnetic rod is inserted into the sleeve.

3. An assembly, comprising:
a magnetic rod guide including
a base for attachment to a part of a filter,
a through aperture through which a magnetic rod can move, and
resilient engagement means including at least one resilient latch on the guide for releasably holding the magnetic rod in one or more fixed positions relative to the guide,
each of the at least one resilient latch further being adapted to allow movement of a magnetic rod through the through aperture in either direction, for insertion into the filter or withdrawal from the filter into one of the fixed positions, in which a first seal is provided inside the through aperture for providing a water-tight seal between the magnetic rod guide and magnetic rod; and
a magnetic rod being cylindrical and sized to slide through the aperture in the guide and into a magnet sleeve of the filter and having one or more co-operating engagement means for engaging with the resilient engagement means of the guide, one end of the magnetic rod including a magnetic rod handle portion, for use in moving the magnetic rod through the guide, the magnetic rod handle portion being disposed on one side of the guide, the magnetic rod being movable relative to the magnetic rod guide and moveable into a position where the magnetic rod is held by the resilient engagement means, and where at least one magnet in the magnetic rod is disposed to the same side of the magnetic rod guide as the handle portion,
wherein the co-operating engagement means of the magnetic rod includes a lower circumferential groove positioned towards a lower end of the magnetic rod.

4. The assembly of claim 1, wherein the magnetic rod includes a plurality of magnets stacked one on top of the other, separated by ferrous metal spacers and held together about a central bar.

5. An assembly, comprising:
a magnetic rod guide including
a base for attachment to a part of a filter,
a through aperture through which a magnetic rod can move, and
resilient engagement means including at least one resilient latch on the guide for releasably holding the magnetic rod in one or more fixed positions relative to the guide,
each of the at least one resilient latch further being adapted to allow movement of a magnetic rod through the through aperture in either direction, for insertion into the filter or withdrawal from the filter into one of the fixed positions, in which a first seal is provided inside the through aperture for providing a water-tight seal between the magnetic rod guide and magnetic rod; and
a magnetic rod being cylindrical and sized to slide through the aperture in the guide and into a magnet sleeve of the filter and having one or more co-operating engagement means for engaging with the resilient engagement means of the guide, one end of the magnetic rod including a magnetic rod handle portion, for use in moving the magnetic rod through the guide, the magnetic rod handle portion being disposed on one side of the guide, the magnetic rod being movable relative to the magnetic rod guide and movable into a position where the magnetic rod is held by the resilient engagement means, and where at least one magnet in the magnetic rod is disposed to the same side of the magnetic rod guide as the handle portion,
wherein the magnetic rod includes a plurality of magnets stacked one on top of the other, and held together about a central bar; and
wherein a vent is provided by at least one gap between the central bar and plurality of magnets.

6. A magnetic filter comprising a filter chamber, an inlet and an outlet and at least one assembly of the magnetic rod, a magnetic sleeve, and the magnetic rod guide of claim 1.

7. The magnetic filter of claim 6, wherein a plurality of magnetic rod and magnetic rod guide assemblies are fitted to the filter.

8. The magnetic filter of claim 7, wherein the plurality of magnetic rod and magnetic rod guide assemblies are fitted to a lid of the filter.

* * * * *